(12) United States Patent
Zavislan (10) Patent No.: US 6,304,373 B1
(45) Date of Patent: *Oct. 16, 2001

(54) IMAGING SYSTEM USING MULTI-MODE LASER ILLUMINATION TO ENHANCE IMAGE QUALITY

(75) Inventor: Jame M. Zavislan, Pittsford, NY (US)

(73) Assignee: Lucid, Inc., Rochester, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/037,546

(22) Filed: Mar. 9, 1998

(51) Int. Cl.$^7$ .................................................. G02B 21/00
(52) U.S. Cl. ........................................... 359/370; 359/368
(58) Field of Search .................................... 359/368, 372, 359/380, 384, 196, 224, 379, 370, 371, 386, 387

(56) References Cited

U.S. PATENT DOCUMENTS

| | | |
|---|---|---|
| 4,975,237 | 12/1990 | Brown . |
| 5,386,317 | 1/1995 | Corle et al. . |
| 5,557,452 * | 9/1996 | Harris .................................... 359/368 |
| 5,589,936 * | 12/1996 | Uchikawa et al. .................... 356/345 |
| 5,625,613 | 4/1997 | Kato et al. . |
| 5,760,901 | 6/1998 | Hill ....................................... 356/345 |
| 5,973,785 * | 10/1999 | Okamoto .............................. 356/354 |
| 6,134,009 * | 10/2000 | Zavislan ............................... 359/371 |
| 6,134,010 * | 10/2000 | Zavislan ............................... 359/371 |

OTHER PUBLICATIONS

Cogswell et al., Confocal diff. interfer. contrast microscopy, Journal of Microscopy, pp. 81–101, Jan. 1992.*

Schmitt et al., "Optical characterization of dense tissue using low-coherence interferometry", SPIE vol. 1889 pp197–211.

Cogswell et al., "Confocal differential interference contrast (DIC) microscopy: including a theoretical analysis of conventional and confocal DIC imaging", Journal of Microscopy, vol. 165,Pt.1, Jan. 1992 pp81–101.

Lessor et al., "Quantitative surface topography determination by Nomarski reflection microscopy.I. Theory", J. Opt. Soc. Am., vol. 69, No. 2, Feb. 1979, pp357–366.

Schmitt et al., "Use of polarized light to descriminate short-path photons in a multiply scattering medium", Applied Optics, vol. 31, No. 30, Oct. 20,1992, pp. 6535–6546.

Rajadhyak et al."In Vivo Confocal Scanning Laser Microscopy of Human Skin: Melanin Provides Strong Contrast", The Society for Investigative Dermatology, Inc., vol. 104, No. 6, Jun. 1995, pp. 1–7.

Rajadhyak et al., "Confocal laser microscope images tissue in vivo", Laser Focus World, Feb. 1997, pp. 119–127.

* cited by examiner

*Primary Examiner*—Cassandra Spyrou
*Assistant Examiner*—Jared Treas
(74) *Attorney, Agent, or Firm*—Kenneth J. LuKacher; Martin LuKacher (57) ABSTRACT

The quality of image produced by confocal microscopy, and especially scanning laser confocal microscopy, is enhanced especially for images obtained in turbid mediums such as many biological tissues specimens, by reducing speckle from scatterers that exist outside (above and below) the section which is being imaged by utilizing reduced coherence illumination, such as provided by a multi-mode laser. The laser beam is focused to provide its intensity in lobes forming offset spots in opposite (180°) amplitude phase relationship. The lobes are combined in the return light from the section and detected after passing through the confocal aperture of the confocal microscope. Images can be formed from the detected return light. Light from scatterers outside the section of interest, which are illuminated by both of the lobes beams overlap outside the section and interfere, thereby reducing speckle due to such scatterers, and particularly scatters which are adjacent to the section being imaged.

12 Claims, 6 Drawing Sheets

IMAGING SYSTEM USING MULTI-MODE LASER ILLUMINATION TO ENHANCE IMAGE QUALITY

This application is related to my U.S. patent application, Ser. No. 08-966,046, filed Nov. 7, 1997 and provisional application Ser. No. 60/072,334, filed Jan. 23, 1998.

DESCRIPTION

The present invention relates to imaging system which enhance image quality by reducing noise which reduces contrast in images, especially images obtained from turbid media, such as encountered in biological specimens, and especially dermatological tissue wherein keratin is present. Media, which are turbid, may be characterized by having a high RMS refractive index variation and high scattering cross sections.

The invention is especially suitable for use in confoca. microscopy and especially in raster scanning confocal microscopes such as the Vivascope confocal scanning raster microscope sold by Lucid Technologies, Inc. of Henrietta, N.Y., U.S.A and described in an article by M. Rajadhyaksha, et al. entitled "*In Vivo Coa,focal Scanning Laser Microscopy of Human Skin, Melanin Provides Strong Contrast*" that appeared in the Journal of Investigative Dermatology, Volume 104, No. 6, pg. 1 (June 1995) and also the subject matter of an article by M. Rajadhyaksha and James M. Zavislan which appeared on Laser Focus World, pg. 119 (February, 1996) and in the hand-held scanning laser microscope which is the subject matter of U.S. patent application Ser. No. 08/650,684 filed May 20, 1996 in the name of James M. Zavislan, et al, now U.S. Pat. No. 5,788,639, issued Aug. 4, 1998. The invention is also useful in optical coherence tomography or interference microscopy.

It has been discovered in accordance with the invention, that by illuminating a medium with low spatial coherence laser radiation, especially transverse multi-mode radiation which propagates and in the $TEM_{01}$ or higher modes, images obtained from return light from an image plane or section within a specimen, by responding to the intensity of the return light, have reduce image distortion. Distortion produced by scattering sites adjacent to the image plane or section tends to be minimized or at least reduced to a constant value, while optical signals due to index variations and other optical activity within the image plane or section (region of interest) are actually detected. Thus, correlated noise from scatterers, which produces optical distortion and especially speckle effects in the image, is reduced, thereby enhancing the quality of the image. The focal region (image plane or section) may be at the surface of the specimen or embedded in the specimen and the incident light is focused at a laser beam waist into components of opposite phases. Outside the focal plane (in the section) the components overlap and destructively interfere before detection. Noise due to scattering sites away from the focal region may occur, whether the region is at the surface or embedded in the specimen. The section being imaged, especially in imaging of biological tissue, can be of the thickness of a cell, for example, about five microns.

Regions adjacent to the section of interest may have an abundance of scatterers, both behind and ahead of the section in the direction of propagation of the illuminating beam, which is incident on the section. These potential scattering sources are illuminated by the same optical field that illuminate the region of interest. There is a finite probability that return light from these scatterers will pass through a confocal aperture and reach the detector as optical signals from which the image of the section of interest is constructed. The spurious return light may manifest itself as speckle in the image. The use of multi-mode laser illumination, in accordance with the invention, has been found to reduce such distortion, and especially speckle distortion, thereby providing additional contrast and enhancing the image quality.

Confocal microscopes have heretofore used single mode lasers which propagate usually in the $TEM_{00}$ mode, in order to obtain a single component spot or dot in the focal plane. As described in RE 34,214 issued Apr. 6, 1993 to Carlsson, the laser beam is focused at a single spot in the focal plane which is conjugate optically to the confocal aperture. The present invention uses a plurality of spots due to lobes (components) of multi-mode, preferably $TEM_{01}$ or higher modes, which lobes are in out of phase amplitude relationship where such modes are focussed (at the laser beam waist-which lies in the focal plane). The lobes overlap outside the focal plane, thus reducing the spurious, undesirable returns from scattering sites outside of the focal plane, which defines the section of the specimen of interest. The above referenced applications use polarization techniques to shear the beams which, like the multi-mode illumination, produces spots which are spaced apart in the focal plane and overlap and cancel spurious reflections (as from scatters) outside the focal plane, but required polarization prisms and lenses. More specifically my prior applications, Ser. Nos. 08-966046 and 60/072,334, referenced above, further enhance image quality in imaging systems by utilizing circularly polarized beams focused on the image plane thereby obtaining noise reduction in the image, especially speckle noise which may be attributable to scatterers adjacent to the image plane. The spots may be laterally offset or vertically offset and provide different modalities for imaging.

The noise reduction system described herein also has application to optical coherence imaging often referred to as optical coherence-domain reflectivity, optical coherence tomograph or optical coherence microscopy. (See Schmitt. et al, *Optical characterization of dense tissues using low-coherence interferometry*, SPIE, Vol. 1889, pps. 197–211, July, 1992). In this imaging modality, a low temporal coherence source is used to illuminate an interferometer with a phase-modulated reference arm and a sample arm. In the sample arm, a focussing objective directs light into a sample, often a turbid biological specimen. Only light which is scattered from a depth in the tissue that has equal optical path as the optical path of the reference arm constructively interferes at the detector to provide an electronic signal that represents the optical signal from the sample. This coherence requirement eliminates the need for a confocal pinhole to select the image plane inside the tissue. Optical coherence imaging however, suffers from the same deleterious effect of adjacent scatters as does confocal imaging. This effect is reduced, however, by the multi-mode laser illumination and detection system previously described.

Accordingly, it is the principal object of the present invention to provide improved imaging systems, and especially imaging systems using confocal microscopy, and more especially improved laser scanning confocal microscopes.

It is a further object of the present invention to provide improved confocal microscopes and especially improved laser scanning confocal microscopes.

It is a still further object of the invention to provide improved confocal laser scanning microscopes which provide images of biological tissue, and especially dermatological tissue.

It is a still further object of the invention to provide improved instruments using optical coherence interferometry.

Briefly described, a system embodying the invention enables viewing a section of a medium. Light is received by and returned from the section and from sites adjacent to the section. The system utilizes transverse multi-mode laser illumination to provide light which is incident on the medium. This incident illumination is focused in the section being imaged to provide spots which are spaced from each other in the plane of the section of interest. The spots are due to the lobes or components of the incident multi-mode laser light which are in opposing (180°) phase amplitude relationship. The lobes overlap outside of the focal plane, thereby providing interference of light returned from the sites (scatterers) adjacent to the section being imaged. The image may be constructed in response to the intensity of the return light.

The foregoing and other objects, features and advantages of the invention, as well as presently preferred embodiments thereof, will become more apparent from reading of the following discussion in connection with the accompanying drawings in which.

Figure 1:
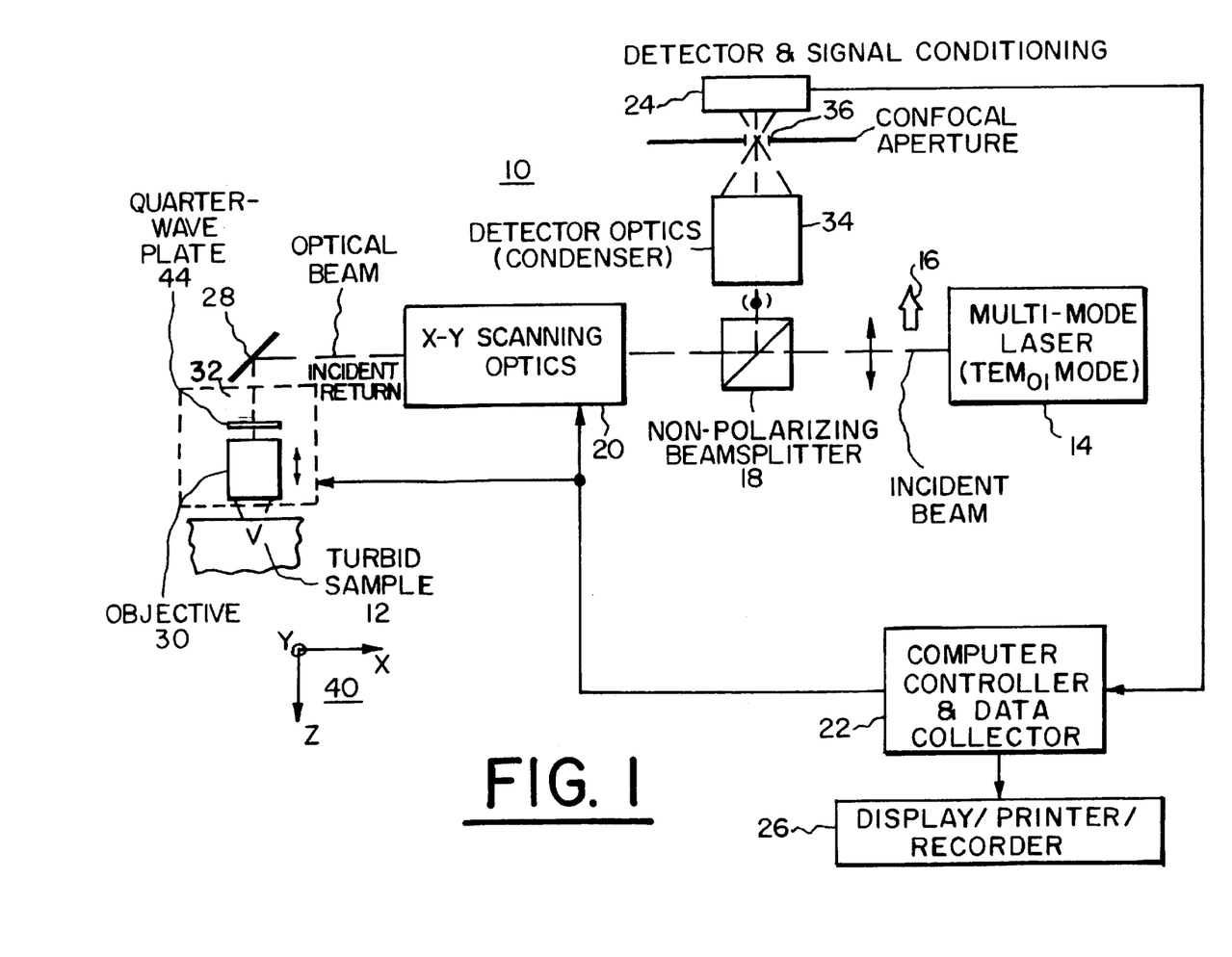
FIG. 1 is a schematic diagram of a laser scanning confocal microscope which embodies the invention.

Referring to FIG. 1, there is shown a confocal laser scanning microscope wherein the beam, which is made incident on and illuminates a turbid sample 12, is obtained from multi-mode laser 14, and which in the case where the microscope is used to image a section of dermatological tissue (forming a turbid sample 12), is preferable in the infra-red range. The incident beam from the laser may be linearly polarized as indicated by the arrow 16. A non-polarizing beam splitter 18 passes the incident beam to scanning optics 20. However, the polarization of the incident beam is not restrictive and any polarization, even circular, may be used.

The scanning optics 20 provide scanning in an X,Y direction, where X and Y are coordinates orthogonal to each other in the image plane. The scanning optics may be an undulating or pivoting mirror and a rotating polygon mirror as in the Vivascope laser scanning confocal microscope referenced above. Orthogonal mirrors may provide the scanning optics, as in the confocal scanning microscope described in the above-referenced publications. The scanning optics is controlled by a computer controller 22 which also collects image data from a photo detector 24 and constructs the image either on a display, printer or a recorder 26.

The incident and return beams are deflected by a mirror 28 through quarter wave plate 44 toward the sample 12 and pass through an objective lens system 30 (also called "objective" herein) to the focal or image plane in the sample 12.

The return light from the image plane is again deflected by the scanning optics 20 and deflected by the beam splitter 18 through detector optics (a condenser lens system) 34 to the detector. The detector 24 optics 34 focuses the light at the center of a confocal aperture 36. In order to select the image plane, the objective 30 together with any processing optics 32 (which may be an assembly) is movable under controller of the computer control 22 in the Z direction, which is a direction perpendicular to the X and Y direction as shown at 40. So far described, except for the processing elements, the confocal laser scanning microscope 10 is similar to that described in the referenced article and patent application.

Figure 1A:
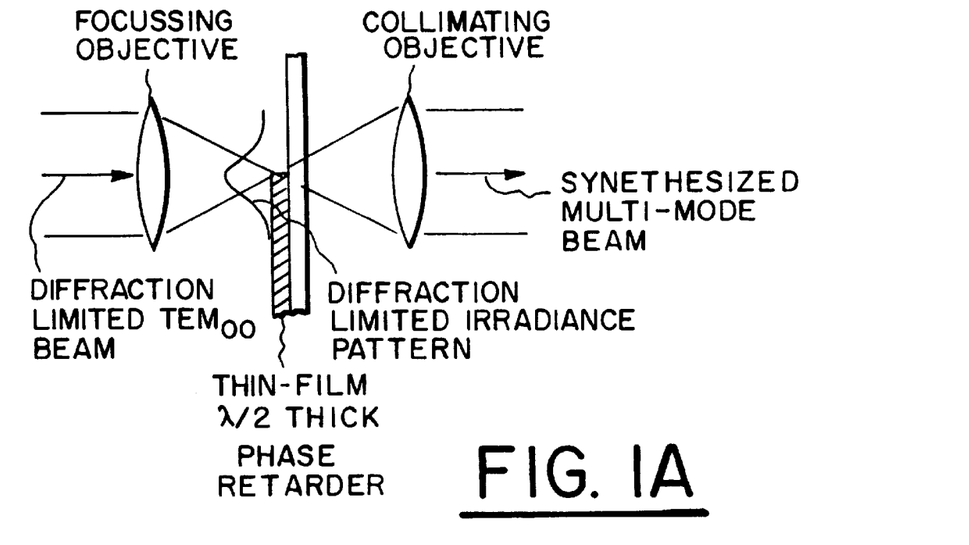
FIGS. 1A & B are schematic diagrams of optical arrangements for synthesizing multimode beams for confocal or optical coherence imaging.
Figure 1B:
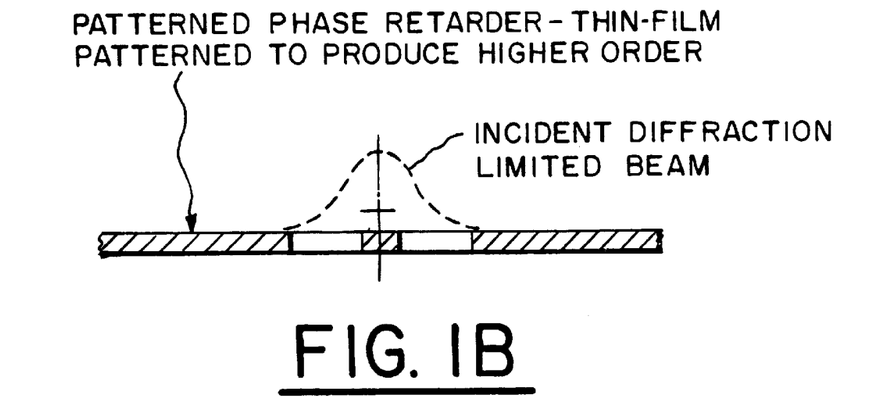

The multi-mode laser 14 may produce multi-mode $TEM_{01}$ or higher (e.g., $TEM_{02}$ or $TEM_{03}$) modes of propagation by design of its cavity. The later may be a laser diode pumped YAG laser which generates light at about 1.06 micron wavelength, but instead of as a diffraction limited single-lobed beam, produces a multi-lobed beam. The mirrors at the ends the cavity or one of them may be cocked away from the confocal axis to enhance the $TEM_{01}$ mode. Alternatively, a split thin film ($\lambda/2$) retarder can be used to generate the $TEM_{01}$ mode or $TEM_{02}$ mode outside of the cavity as shown in FIG. 1A & FIG. 1B. Reference may be had to the following for more information or to the design of a suitable multi-mode laser: O. Svelto, Principles of Lasers, 3RD Edition, Plenum Press, NY & London, 1989 see, especially, pps. 137–206.

Figure 2:
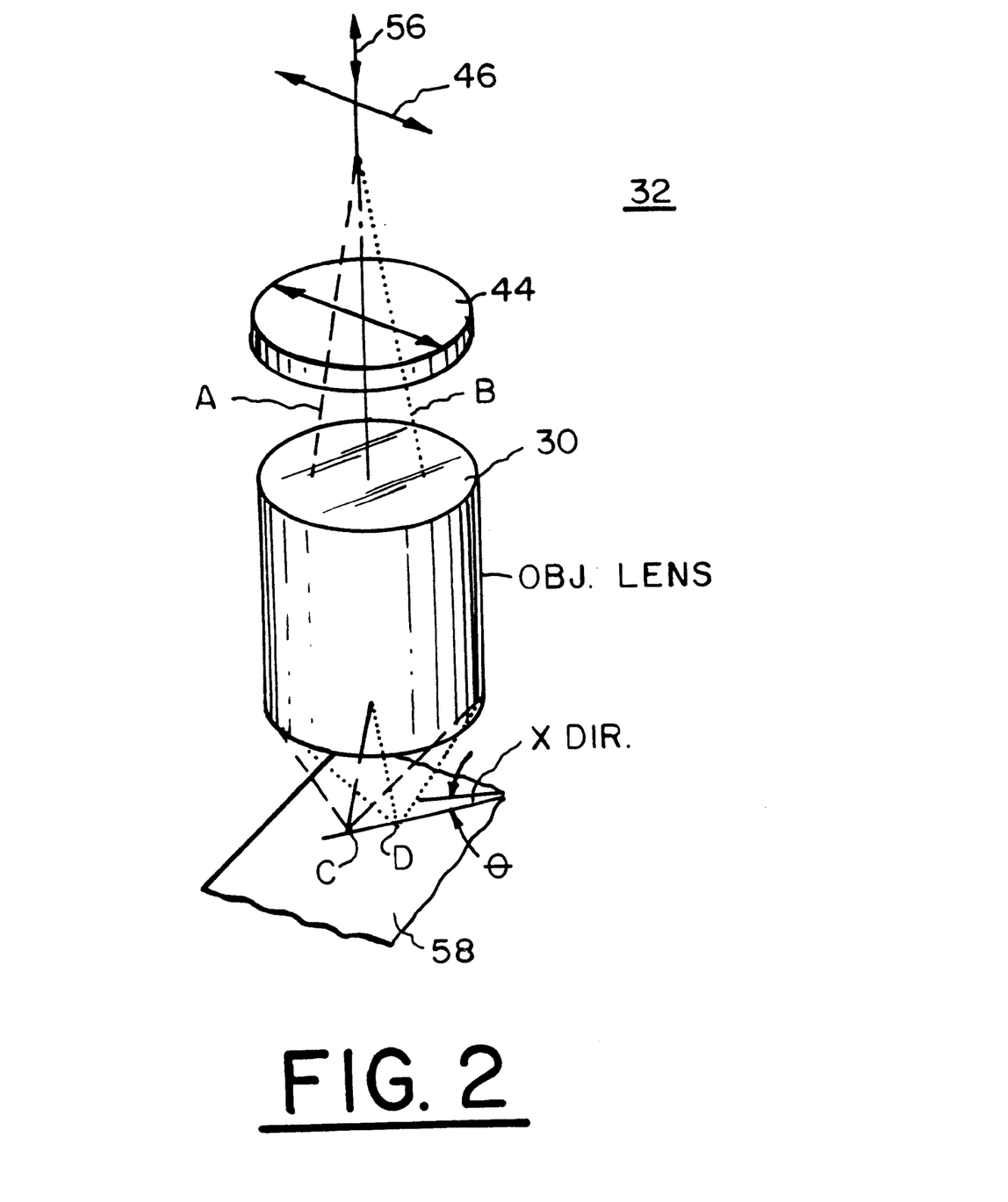
FIG. 2 is a schematic diagram illustrating the processing, in the microscope of FIG. 1, of the incident multi-mode light and the collection of the return light from an image section which is shown as a focal plane.

Referring to FIG. 2, the $TEM_{01}$ mode effectively provides two beam components A and B. The beam components A and B are focused as spots C and D, respectively in the focal or image plane 58. It will be appreciated that these spot:; are scanned in X, Y and Z over the image plane in order to provide optical signals from which the image can be constructed, after detection by the detector 24, in the computer controller 22.

Figure 2A:
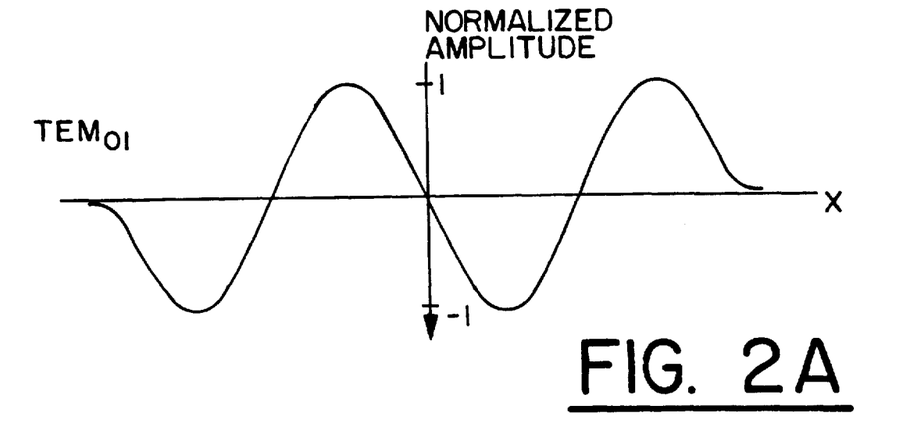
FIGS. 2A, 2B and 2C are plots of the amplitude of the multi-mode laser beam at the beam waist in the focal plane shown in FIG. 2, for $TEM_{01}$ $TEM_{02}$ and $TEM_{03}$, illumination respectively.
Figure 2B:
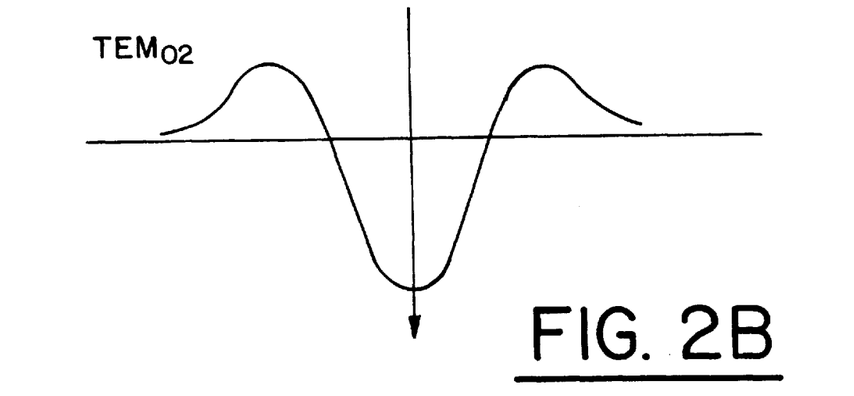
Figure 2C:
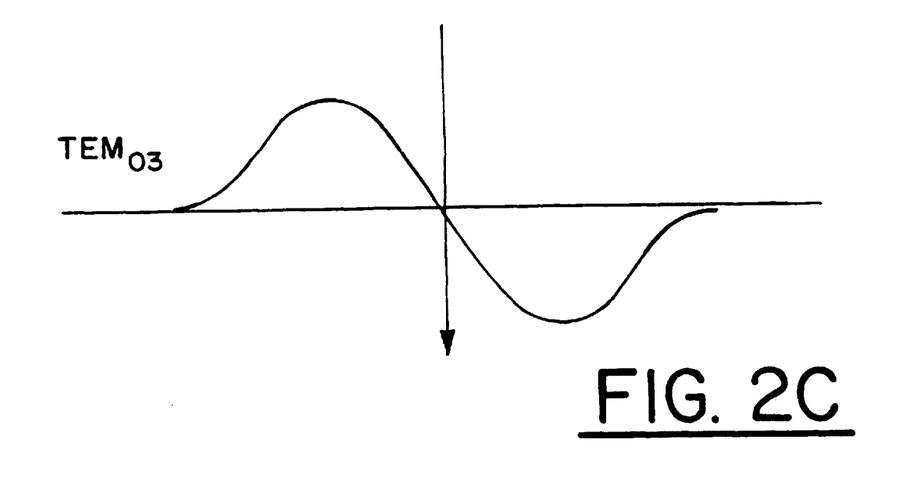

The components are two lobes of $TEM_{01}$ focused mode. The components are 180° out of phase, as shown in FIG. 2A. They form an optical beam with two laterally offset illumination zones which have substantially overlap of the two beams in regions away from the beam waist. Thus, scatterers outside of focus will create a scattered light field with two electric field modes that are out of phase. These two electric fields will cancel as the collected scattered light is imaged to the confocal aperture 36 which is conjugate to the illuminating beam waist. As shown in FIGS. 2B and 2C, higher modes may be used. In the $TEM_{02}$, mode spaced pairs are of about equal and opposite amplitude.

The light is returned and collected by the objective 30 and combined. The intensity of light returned from the spots C and D depends upon the optical reflectance averaged across the spots C and D. The intensity is the sum of the squares of amplitude of the light returned from each spot C and D. Accordingly, the amount of light from the image plane which is focused by the condenser 34 and passes through the confocal aperture as the optical signal which is detected by the detector 24, depends upon the effect of the material specimen in the focal plane.

Figure 3:
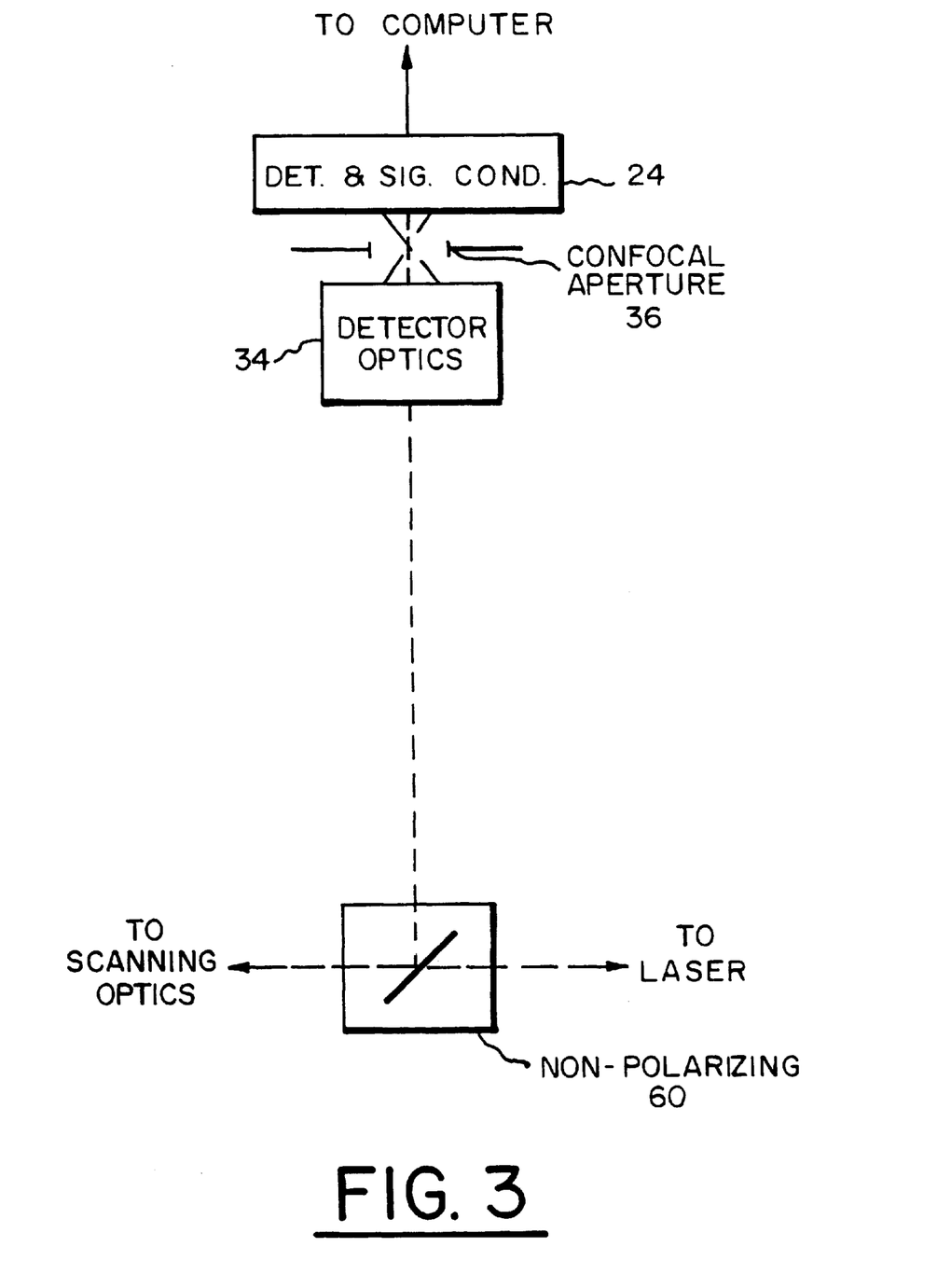
FIG. 3 is a schematic diagram showing the collection optics in the return arm of a confocal microscope system of the type illustrated in FIG. 1 which detects intensity of the return light and enables the construction of the image in response thereto.

Referring to FIG. 3, collection optics of the invention is illustrated. A non-polarizing or leaky beam splitter 60 (represented by 18 in FIG. 1), passes the laser light beam to the scanning optics. The intensity of the light from the scatterers outside of the focal plane is the coherent sum from each $TEM_{01}$ component. The return beam is then focused by detector optics 34 at the confocal aperture 36 and then detected by the photo detector 24. Since the $TEM_{01}$ components overlap, they interfere and cancel in the combined beam passing through the confocal aperture 36.

Figure 4:
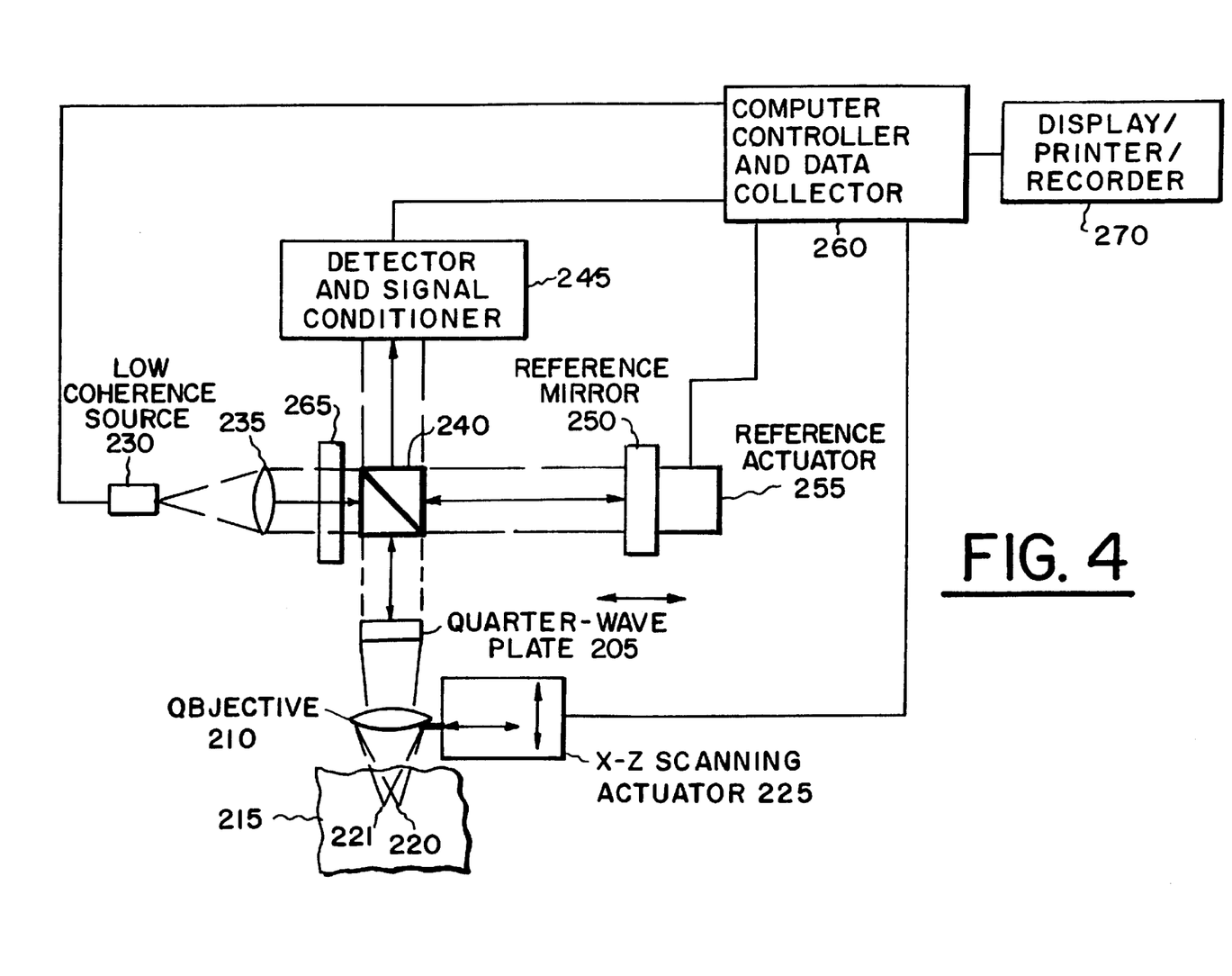
FIG. 4 is a schematic diagram of an optical coherence imaging system embodying the invention.

FIG. 4 shows an optical coherence imaging system with improved imaging. A low temporal coherence optical source 230 provides transverse multi-mode illumination. The laser 14 or the techniques of FIGS. 1A and 1B may be used, but a super luminescent diode or femtosecond laser is suitable. The light therefrom is collimated by lens 235. A linear polarizer 265 polarizes the incident light. The polarization state is oriented to be in the plane of FIG. 4. The light then passes into beam splitter 240 which is nominally 50%–50% non-polarizing beam splitter. A portion of the light is directed to a reference mirror 250. Reference mirror 250 is actuated by transducer 255, which may be a piezo-electric actuator. This actuation modulates the phase of the reference arm light.

Light scattered from the two spots inside, or on, the object is collected by lens 210 and angularly combined in the objective 210 and directed towards the beam splitter 240. A portion of the reference and sample light is directed to a photodetector and signal conditioning circuit 245 which may be a silicon photodiode and amplifier. The portion of the light from both arms incident on the detector that is both parallel and coherent will interfere in a detection arm terminated at the detector 245 and produce a phase modulated electric signal which varies synchronously with the reference mirror position. The amplitude of the modulated signal is proportional to the reflectivity of the subject at the point inside the object that has equal optical path as the reference arm to within the coherence length of the source.

As with the confocal system described previously, there are signal contributions from scatterers above and below the surface which equal path as the reference arm. These scatters will produce speckle noise that interferes with the fidelity of the signal. The scatterers which are outside the surface of equal optical path will be illuminated by the overlapping lobes or components. The light from these scatters will be substantially destructively interfering at the detector because the two components have 180° phase difference and illuminate each of the scatterers similarly.

Controller 260 controls the scan position of the objective lens 210 through actuator 225. Controller 260 also controls the position of actuator 255 which controls the position of the reference mirror 250. The controller collects the signal and decodes it with the position information of the actuators and drives a display or recorder 270.

From the foregoing description, it should be apparent that there has been provided an improved imaging system, and especially an imaging system which is especially adapted for providing improved confocal microscopes and especially laser scanning confocal microscopes and which is also applicable for optical coherence tomography or microscopy. Variations and modifications in the herein-described system, within the scope of the invention, will undoubtedly suggest themselves to those skilled in the art. Accordingly, the foregoing description should be taken as illustrative and not in a limiting sense.

What is claimed is:

1. A confocal microscope system for viewing of a section of a medium which receives and returns light both from the section and from sites outside the section, said system comprising confocal optics and a source of light having propagation characteristics which illuminate the medium with light having components of implitude which are in opposing phase relationship and are spaced transversely from each other in the section, but are in spatially overlapping relationship at sites one of behind, ahead, or behind and ahead, of the section, and said confocal optics having a confocal aperture at which said return light from said components is combined for detection, thereby providing for reduction of effect of light returned from said sites and enabling construction of said image in response to said components from said section.

2. The system of claim 1 wherein said light is provided by a transverse multimode laser source and means are provided for focusing said components at a plurality of spots of incident light in said section.

3. The system of claim 2 wherein said light is propagated from said source in a TEM mode higher than $TEM_{00}$.

4. The system of claim 3 wherein said mode is selected from the group consisting of $TEM_{01}$ $TEM_{02}$ $TEM_{03}$.

5. The system according to claim 2 further comprising a scanner in the path of said light for scanning said spots with respect to said section.

6. The system according to claim 5 wherein said scanner is an X–Y scanner, where X and Y are orthogonal directions along said section, an objective focusing said light at said spots, and said objective being movable in a Z direction orthogonal to said X and Y directions.

7. The system according to claim 5 wherein said scanner is in the path of said incident and return light.

8. The system of claim 1 wherein source is a multi-mode laser which propagates in the $TEM_{01}$ or higher modes of propagation.

9. The system according to claim 1 further comprising a condenser for providing said return light and an objective for focusing said spots, thereby providing said microscope for viewing or construction of an image of said section.

10. The system according to claim 9 wherein said is a confocal microscope has a splitter passing light received by said medium and deflecting said return light to said condenser, said condenser focusing said return light at said confocal aperture.

11. The system according to claim 1 wherein said source is an illuminator including a laser providing a beam of transverse multi-mode light which is incident on said medium sheared in a direction transverse to the direction of said beam.

12. An optical coherence imaging system for viewing of a section of a medium along an imaging plane which receives and returns light both from the section and from sites outside the section, said system comprising:

a source of light having propagation characteristics which are in opposing phase relationship;

optics for directing the light from the source into a reference arm and a sample arm, in which light from the sample arm is incident onto an imaging plane spaced transversely from each other in the section and in a spatially overlapping relationship at sites one of behind, ahead, or behind and ahead, of the section, and said optics receive light returned from the imaging plane;

means for modulating the light of the reference arm; and means for providing images in response to interference of light from the modulated reference arm and the returned light representative of a section of the medium along the imaging plane.

* * * * *

UNITED STATES PATENT AND TRADEMARK OFFICE
CERTIFICATE OF CORRECTION

| | | |
|---|---|---|
| PATENT NO. | : 6,304,373 B1 | Page 1 of 2 |
| APPLICATION NO. | : 09/037546 | |
| DATED | : October 16, 2001 | |
| INVENTOR(S) | : Zavislan | |

It is certified that error appears in the above-identified patent and that said Letters Patent is hereby corrected as shown below:

On the title page- item 75, Inventor's name, should be changed from "Jame" to --James--.
In sheet 4 of the drawings, "Fig. 2C" should be --FIG. 2A-- and the legend "TEM 03" should be changed to --TEM 01--.
"FIG. 2A" should be --FIG. 2C-- and the legend "TEM 01" should be changed to --TEM 03-- as shown in the attached sheet.
In Claim 9, column 6, line 32, "1" should be changed to --2--.

Signed and Sealed this

Tenth Day of June, 2008

JON W. DUDAS
*Director of the United States Patent and Trademark Office*